(12) United States Patent
Easter-Robinson et al.

(10) Patent No.: US 11,027,387 B2
(45) Date of Patent: Jun. 8, 2021

(54) SYSTEM AND METHOD FOR MONITORING CHARACTERISTICS OF A ROTARY TABLE

(71) Applicant: NIKKEN KOSAKUSHO EUROPE LIMITED, Rotherham (GB)

(72) Inventors: Rowan Robert Easter-Robinson, Rotherham (GB); Nathan Ray, Rotherham (GB)

(73) Assignee: NIKKEN KOSAKUSHO EUROPE LIMITED, Rotherham (GB)

( * ) Notice: Subject to any disclaimer, the term of this patent is extended or adjusted under 35 U.S.C. 154(b) by 84 days.

(21) Appl. No.: 16/375,819

(22) Filed: Apr. 4, 2019

(65) Prior Publication Data

US 2019/0308290 A1 Oct. 10, 2019

(30) Foreign Application Priority Data

Apr. 5, 2018 (GB) ..................................... 1805668

(51) Int. Cl.
| | | |
|---|---|---|
| *B23Q 7/02* | (2006.01) | |
| *B23Q 1/25* | (2006.01) | |
| *B23Q 15/013* | (2006.01) | |
| *G05B 19/404* | (2006.01) | |
| *B23Q 16/02* | (2006.01) | |
| *B23Q 5/56* | (2006.01) | |

(52) U.S. Cl.
CPC ................. *B23Q 7/02* (2013.01); *B23Q 1/25* (2013.01); *B23Q 5/56* (2013.01); *B23Q 15/013* (2013.01); *B23Q 16/025* (2013.01); *G05B 19/404* (2013.01); *B23Q 2220/004* (2013.01)

(58) Field of Classification Search
CPC ... B23Q 1/25; B23Q 5/56; B23Q 7/02; B23Q 15/013; B23Q 16/025; B23Q 2220/004; G05B 19/404
See application file for complete search history.

(56) References Cited

U.S. PATENT DOCUMENTS

| | | | | |
|---|---|---|---|---|
| 2008/0047120 A1* | 2/2008 | Soroka | ..................... | B23Q 1/52 29/270 |
| 2010/0023156 A1* | 1/2010 | Trepina | ................ | G05B 19/406 700/175 |
| 2011/0245936 A1* | 10/2011 | Hermann | .......... | G05B 19/41845 700/86 |
| 2014/0197773 A1* | 7/2014 | Ikai | ....................... | G05B 19/404 318/630 |
| 2014/0354209 A1* | 12/2014 | Fujita | ....................... | B23Q 5/56 318/639 |
| 2015/0026107 A1* | 1/2015 | Vijayaraghavan | ..... | G06Q 10/06 706/12 |

FOREIGN PATENT DOCUMENTS

JP 01274947 A * 11/1989
WO WO-2013150541 A2 * 10/2013 ............... G06N 5/04

OTHER PUBLICATIONS

Machine translation of JP 01274947 A obtained on Aug. 12, 2020.*

* cited by examiner

*Primary Examiner* — Adam D Rogers (74) *Attorney, Agent, or Firm* — Joseph E Root (57) ABSTRACT

A rotary table (10a) for a milling machine, comprising sensing means (30,32) configured to measure and/or calculate a clearance between two mating components of said rotary table (10a), and transmission means configured to transmit said measured/calculated clearance to a central processing unit. The mating components of the rotary table being a worm screw and a worm wheel.

16 Claims, 8 Drawing Sheets

SYSTEM AND METHOD FOR MONITORING CHARACTERISTICS OF A ROTARY TABLE

FIELD OF THE INVENTION

The present invention relates to a system and method for monitoring one or more characteristics of a rotary table, in particular for monitoring the backlash condition of a rotary table.

BACKGROUND OF THE INVENTION

There is a growing need in a number of industrial sectors for an increase in the availability of automation and data exchange in manufacturing technologies.

In some industrial sectors, the ideal situation is the creation of a so called "smart factory" wherein the factory is arranged in a modular structure and cyber-physical systems are used to monitor physical processes, create a virtual copy of the physical world and make decentralized decisions.

It is envisioned that, over the Internet of Things, cyber-physical systems communicate and cooperate with each other and with humans in real time, and via the Internet of Services, both internal and cross-organizational services are offered and used by participants of the value chain.

Rotary tables are generally used with milling machines as a precision work positioning device, especially computer numerical control (CNC) milling machines, as it enables an operator to drill or cut work at exact intervals around a fixed axis.

While some characteristics of various components of a CNC milling station (a typical CNC milling station incorporates components such as a milling machine, a rotary table, tool changer etc), for example the average weekly machining time of the milling machine, may be quite straight forward and easy to measure or obtain, it is more challenging to measure and collect data in relation to certain characteristics of the rotary table.

There is therefore a requirement for a system and method for monitoring the characteristics of a rotary table which can be used to improve the workings of a CNC milling station whether as part of smart factory or otherwise.

There is also a requirement for a rotary table wherein the backlash can be easily monitored and measured in order to maintain consistent quality and/or standards of a tasked performed using the rotary table.

SUMMARY OF THE INVENTION

According to a first aspect of the present invention, there is provided a rotary table for a milling machine, comprising sensing means configured to measure and/or calculate a clearance between two mating components of said rotary table, and transmission means configured to transmit said measured/calculated clearance to a central processing unit; wherein said mating components of said rotary table are a worm screw and a worm wheel.

The sensing means and transmission means allow for condition monitoring of the rotary table.

In exemplary embodiments, said sensing means comprises a first encoder coupled to said worm screw of the rotary table and a second encoder coupled to said worm wheel of the rotary table.

The encoders allow the position of the worm screw and the worm wheel to be easily determined, allowing for the relative positions between the two components to be measured or calculated in order to determine the backlash of the rotary table.

In other exemplary embodiments, said sensing means comprises a current sensor configured to measure the current flow through a power line into a servo motor of the rotary table. Said sensing means may further comprise a switch mounted on a faceplate the rotary table.

In yet other exemplary embodiments, said sensing means comprises an encoder configured to measure the position of a servo motor of the rotary table, and a switch mounted on a faceplate of the rotary table.

According to a second aspect, there is provided a milling station comprising a milling machine and a rotary table according to a first aspect of the invention.

According to a third aspect, there is provided an industrial shop floor configuration comprising two or more milling stations according to the second aspect of the invention.

According to a fourth aspect, there is provided a system of monitoring the characteristics of a rotary table comprising at least one rotary table in accordance with the first aspect and a central processor for receiving and processing data transmitted from said at least one rotary table.

The system according to the fourth aspect benefits from modern information and communication technologies like cyber-physical systems, big data analytics and cloud computing. The system in accordance with the fourth aspect will help early detection of defects and production failures, thus enabling their prevention and increasing productivity, quality, and agility benefits that have significant competitive value.

In addition, the system in accordance with the fourth aspect allows for the gathering of information on several different aspects of the machining process and the mechanics of the rotary table in situ.

Preferably, the system comprises a plurality of rotary tables in accordance with the first aspect, and the central processor is configured to receive and process data transmitted from each of said plurality of rotary tables.

Preferably, the system is configured to monitor backlash of said at least one rotary table or plurality of rotary tables.

Preferably, said central processor is a computer.

Preferably, the system further comprises a local server on the same site as one of said at least one rotary table, said local server being connected to said central processor.

Preferably, said local server comprising transmitting means and receiving means configured to transmit and receive data and information from an offsite location.

Conveniently, said local server comprises a user interface means.

In exemplary embodiments comprising a local server, preferably one or more of said at least one rotary table located on the same site as the local server is connected to the local server via a wired or wireless transmission means. Preferably, each rotary table located on the same site as the local server is connected to the local server via a wired or wireless transmission means.

The system may further comprise a master server in addition to the local server(s). Preferably, the master server is located at a different site to at least one of said local servers.

Preferably, the master server comprises a user interface means.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILS DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
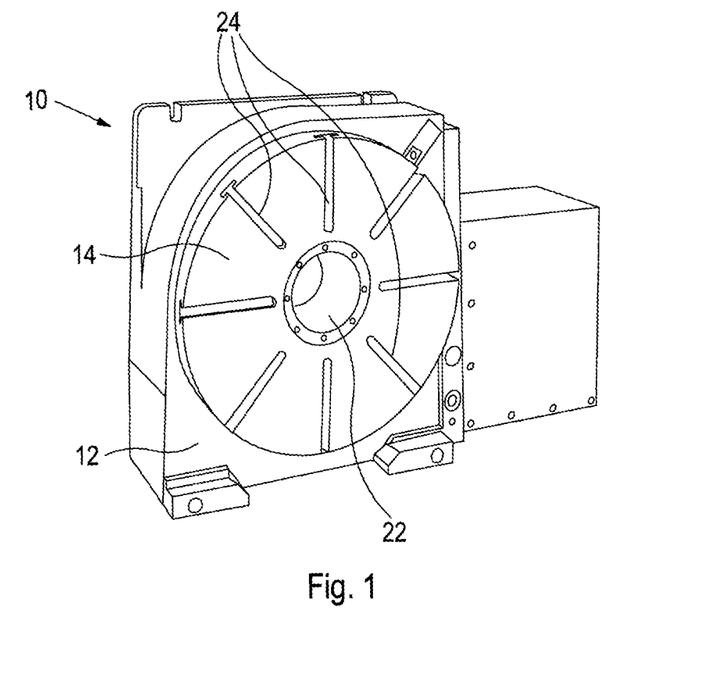
FIG. 1 is a schematic view of a rotary table for use with the invention.
Figure 2:
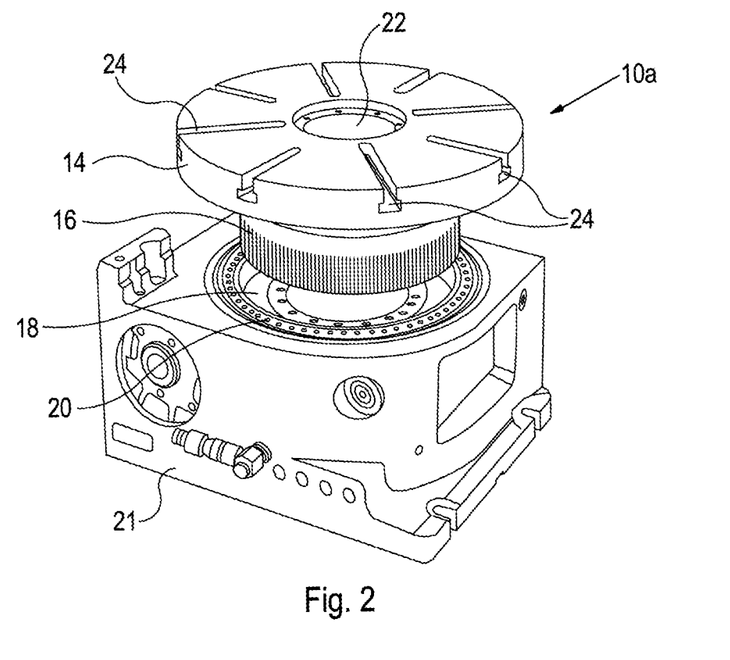
FIG. 2 is an exploded view of a rotary table for use with the invention.

Referring to FIGS. 1 and 2, embodiments of a rotary table 10, 10a for use with the backlash monitoring system of the invention is shown. The rotary table in FIG. 2 is shown in exploded view. It would be understood by the skilled person that the application of the backlash monitoring system of the invention is not limited to the rotary table configurations depicted in FIGS. 1 and 2.

The rotary tables each comprise a main body 12, a faceplate 14, a worm wheel 16 on which the faceplate 14 is mounted, and a worm screw 18 in mechanical engagement with the worm wheel 16. The arrangement of and relationship between the above-mentioned components is known in the art and as such will not be described in further detail.

In the embodiments shown, the faceplate 14 is a monoblock faceplate.

The worm wheel 16, worm screw 18 and main body 12 may be made from any suitable material. For example, the worm wheel 16 may be constructed from special hardened ion nitride steel, the worm screw 18 from a carbide material, and the main body from high-density grey cast iron.

The rotary tables 10, 10a include a face & radial roller bearing system 20, which may incorporate a Teflon® sealing, incorporated into the main body 12 configured to support axial loads and radial loads as known in the art.

The faceplate 14 includes a centre hole 22 and a plurality of T-slots 24. It would be understood that in other configurations, T-slots may be omitted from the faceplate 14.

The system in accordance with the invention for monitoring the backlash of a rotary table incorporates sensing means configured to measure and/or facilitate the calculation of a clearance between two mating components of said rotary table. The system also includes transmission means configured to transmit said measured clearance or data obtained to facilitate the calculation of the clearance to a central processing unit.

Figure 3:
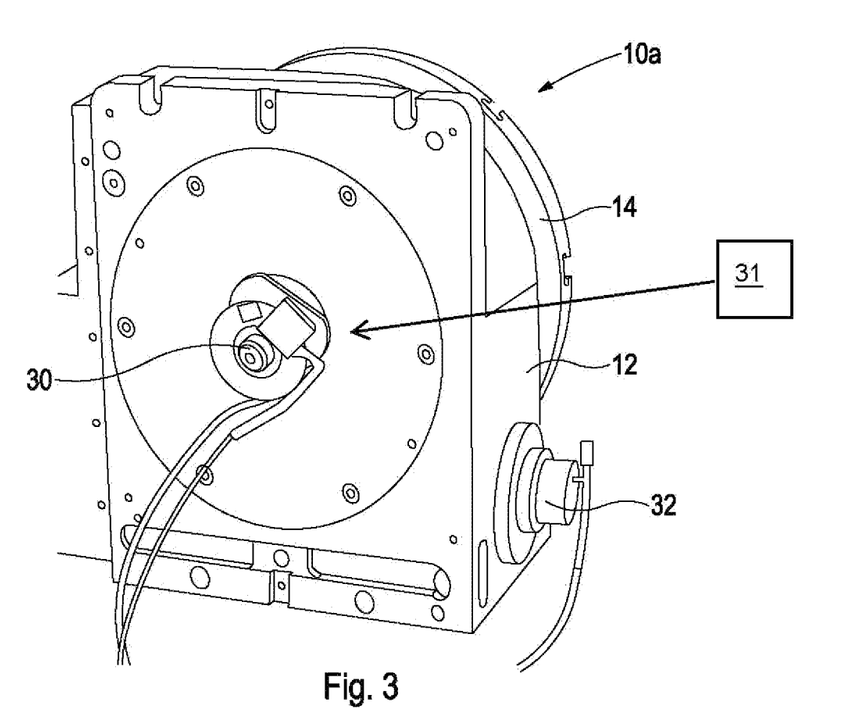
FIG. 3 is an embodiment of a rotary table in accordance with the invention incorporating a first embodiment of the backlash monitoring system of the invention.

Referring to FIG. 3, a first embodiment of the sensing means forming part of the system in accordance with the invention is shown coupled to the rotary table of FIG. 2.

In the embodiment shown, the sensing means is in the form of a pair of encoders 30, 32, such as a rotary encoder. One of said pair of encoders 30 is attached to the worm wheel 16 of the rotary table 10a and the other of said pair of encoders 32 is attached to the worm screw 18 of the rotary table 10a.

The encoders 30, 32 are configured to gather data in relation to the respective component they are attached to, in particular the respective positions of the two.

The difference between the position of the worm screw 18 and the worm wheel 16 is used to determine the backlash of the rotary table 10a. This is achieved by calculating the clearance between the worm screw 18 and the worm wheel 16.

Figure 4:
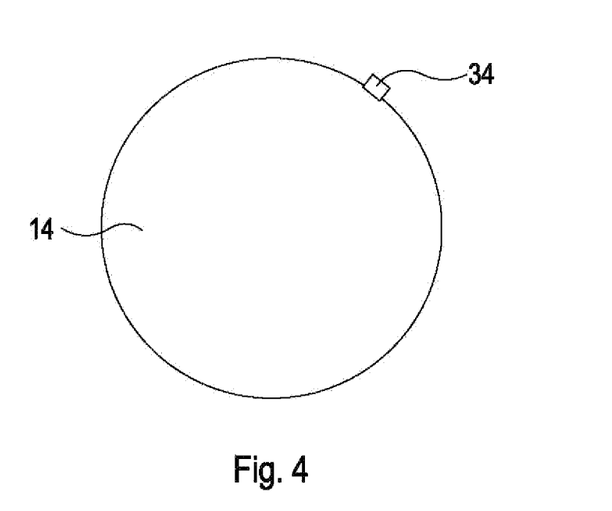
FIG. 4 is a schematic representation of the sensing means forming part of a second embodiment of a backlash monitoring system of the invention.

With reference to FIG. 4, a second embodiment of the sensing means forming part of the system in accordance with the invention will now be described.

The sensing means incorporates a low cost current flow sensor (not shown) configured to measure the current flow through a power line into the servo motor of the rotary table. The low cost current flow line allows the position of the servo motor to be determined.

The sensing means also incorporates a switch 34 positioned on the faceplate 14. The switch 34 is used to determine the position of the faceplate 14.

The comparison between the position of the faceplate 14 and the servo motor is used to calculate the total backlash along the drivetrain.

An example of the method for determining the backlash of the rotary table using the second embodiment of the sensing system in accordance with the invention will now be described.

First, the current flow through a single phase of the 3-phase servo motor is first measured at high frequency (for example 4000 Hz) using the current flow sensor in order to measure the position of the servo motor.

The switch 34, which may for example be an electromechanical switch, is configured to be activated at a certain rotation of the faceplate 14. The switch 34 is used to note the position of the faceplate 14.

A full or partial rotational cycle of the faceplate 14 is then run.

This is done by first rotating the faceplate 14 of the rotary table in a counterclockwise (ccw) direction a predetermined number of degrees, for example 20 degrees. The predetermined number of degrees is such that the distance traveled by the faceplate 14 of the rotary table is about the switch's 34 activation/deactivation point so that the switch 34 is opened at some point 35 along this path.

Figure 5:
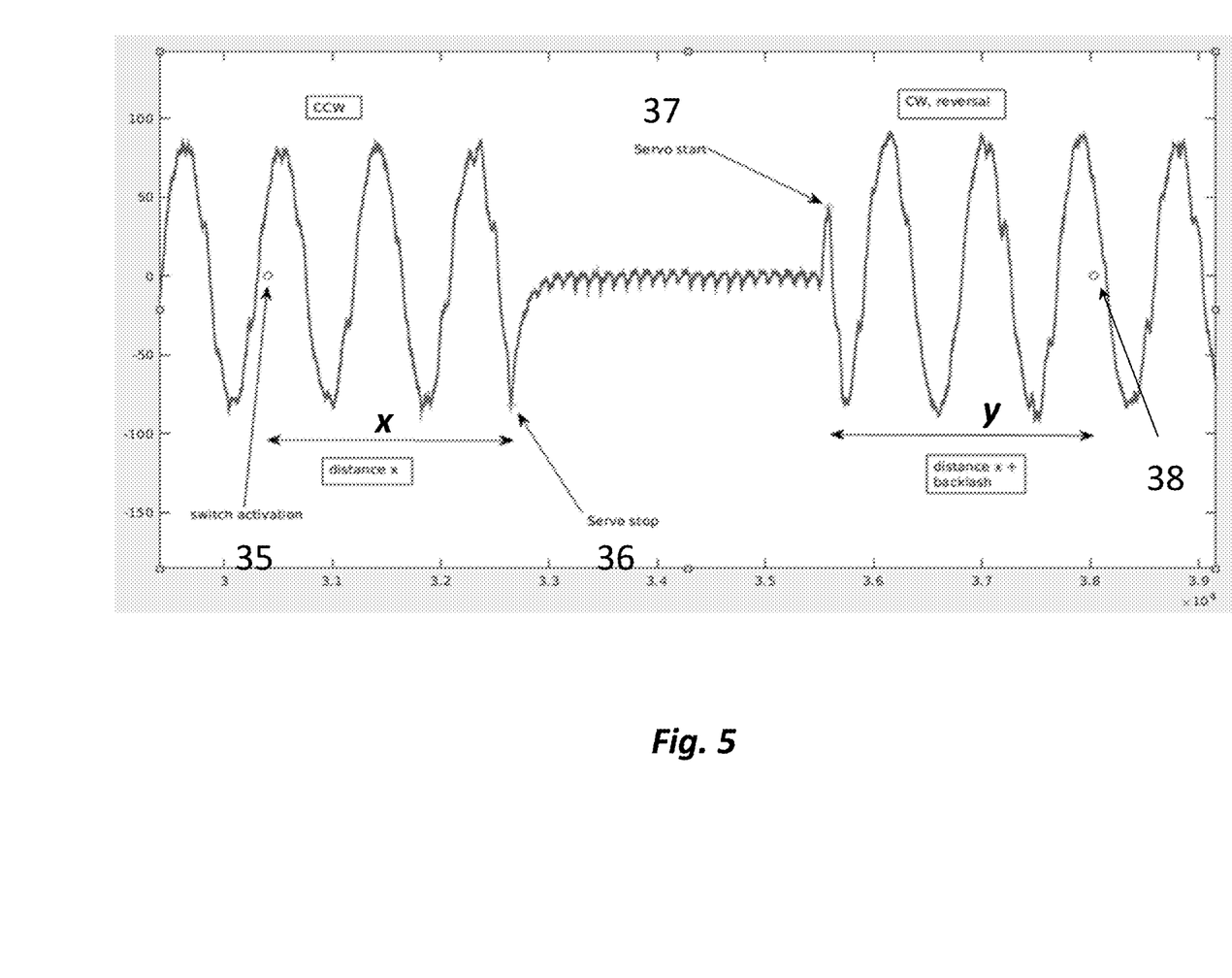
FIG. 5 is a graph showing the current profile of the servo motor phase of a rotary table incorporating the second embodiment of the backlash monitoring system of the invention.

The distance between the switch opening 35 and the rotation of the rotary table stopping 36 is given a first value x.

The face plate 14 of the rotary table is then moved in reverse at the same RPM and for the same angle of rotation, in this case rotated clockwise 20 degrees. The switch 14 will close at some point along this reversal rotation.

The point between the rotary table starting 37 to reverse and the switch closing 38 is given a second value y.

y is equal to x+backlash value, so the backlash can be calculated by subtracting x from y.

A graph showing the current profile of the servo motor phase of the rotary table during the ccw and cw rotations is shown in FIG. 5.

The Applicant has found that there is a clear linear correlation between the measurement obtained by the second embodiment of the sensing system in accordance with the invention and the actual backlash of the rotary table used for the tests.

Figure 6:
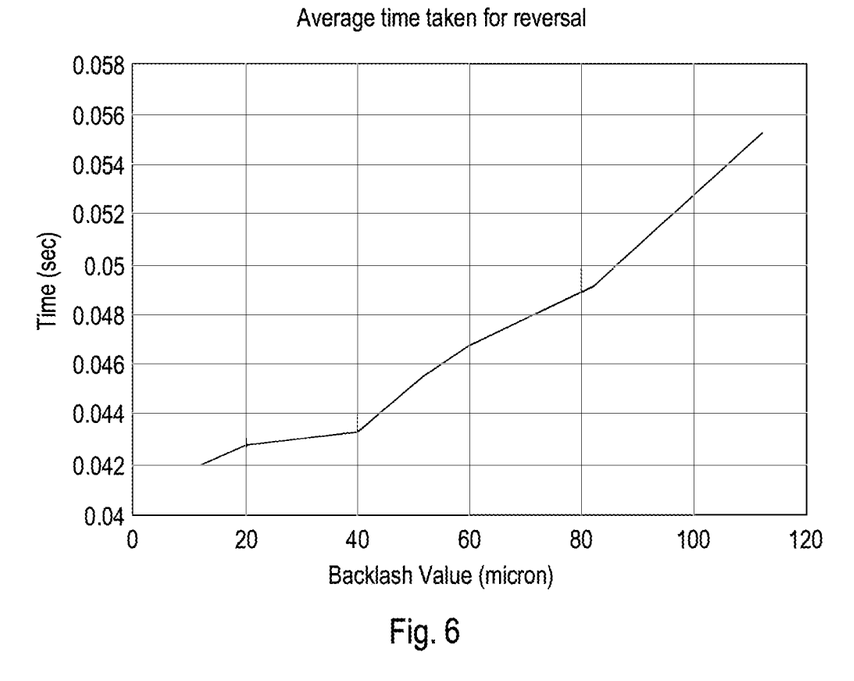
FIG. 6 is a graph showing the correlation between the average time taken for reversal of the faceplate and the backlash value using the second embodiment of the backlash monitoring system in of the invention.

The correlation between the backlash value and average time take for reversal for an exemplary rotary table is shown in FIG. 6.

An advantage of the above described method is that the system for the monitoring of the backlash of a rotary table in accordance with the second embodiment is completely retro-fittable and requires minimal interference into the electrical connections of the rotary table.

Figure 7:
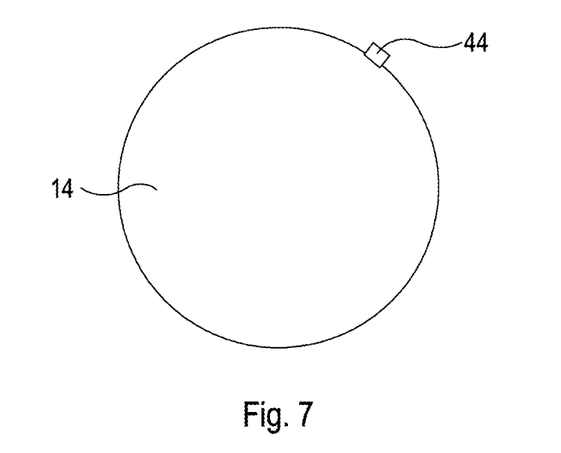
FIG. 7 is a schematic representation of the switch and faceplate arrangement on a rotary table incorporating the backlash monitoring system in accordance with the third embodiment of the invention.
Figure 8:
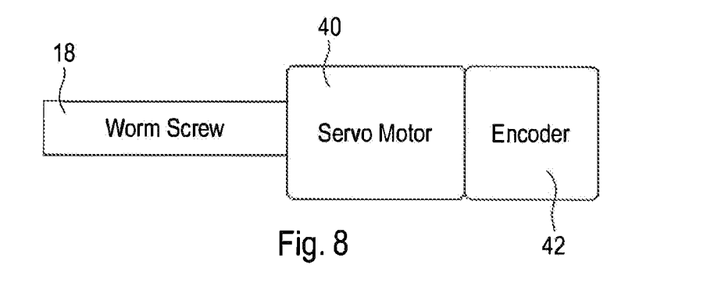
FIG. 8 is a schematic representation of the rotary table drive train and encoder arrangement of a rotary table incorporating the backlash monitoring system in accordance with the third embodiment of the invention.

With reference to FIGS. 7 and 8, a third embodiment of the sensing means forming part of the system in accordance with the invention will now be described.

In the third embodiment, the sensing means incorporates a switch 44 positioned on the faceplate 14. The switch 44, in a similar manner to the switch 34 of the second embodiment, is configured to allow the determination of the position of the faceplate 14.

The system further utilizes a servo encoder 42 which is integral to the rotary table in order to measure the position of the servo motor 40.

The switch and faceplate arrangement is depicted in FIG. 7, while the rotary table drive train and encoder arrangement is shown in FIG. 8.

The backlash is calculated by comparing the position of the faceplate obtained via the switch 44 with the position of the servo motor 40 obtained via the servo encoder 42. As previously mentioned, the discrepancy between the two positions is the backlash of the rotary table.

While FIG. 8 schematically shows the servo motor 40 directly connected to the worm screw 18, it would be understood that in some rotary table configurations additional gears may exist in between the servo motor 40 and the worm screw 18. In such configurations, the backlash in these gears will also be measured using the sensing system in accordance with the third embodiment.

As will be understood by a person skilled in the art, the type of encoder used in implementing the system would be chosen to be compatible with the type of machine that the rotary table is fitted to.

Figure 9:
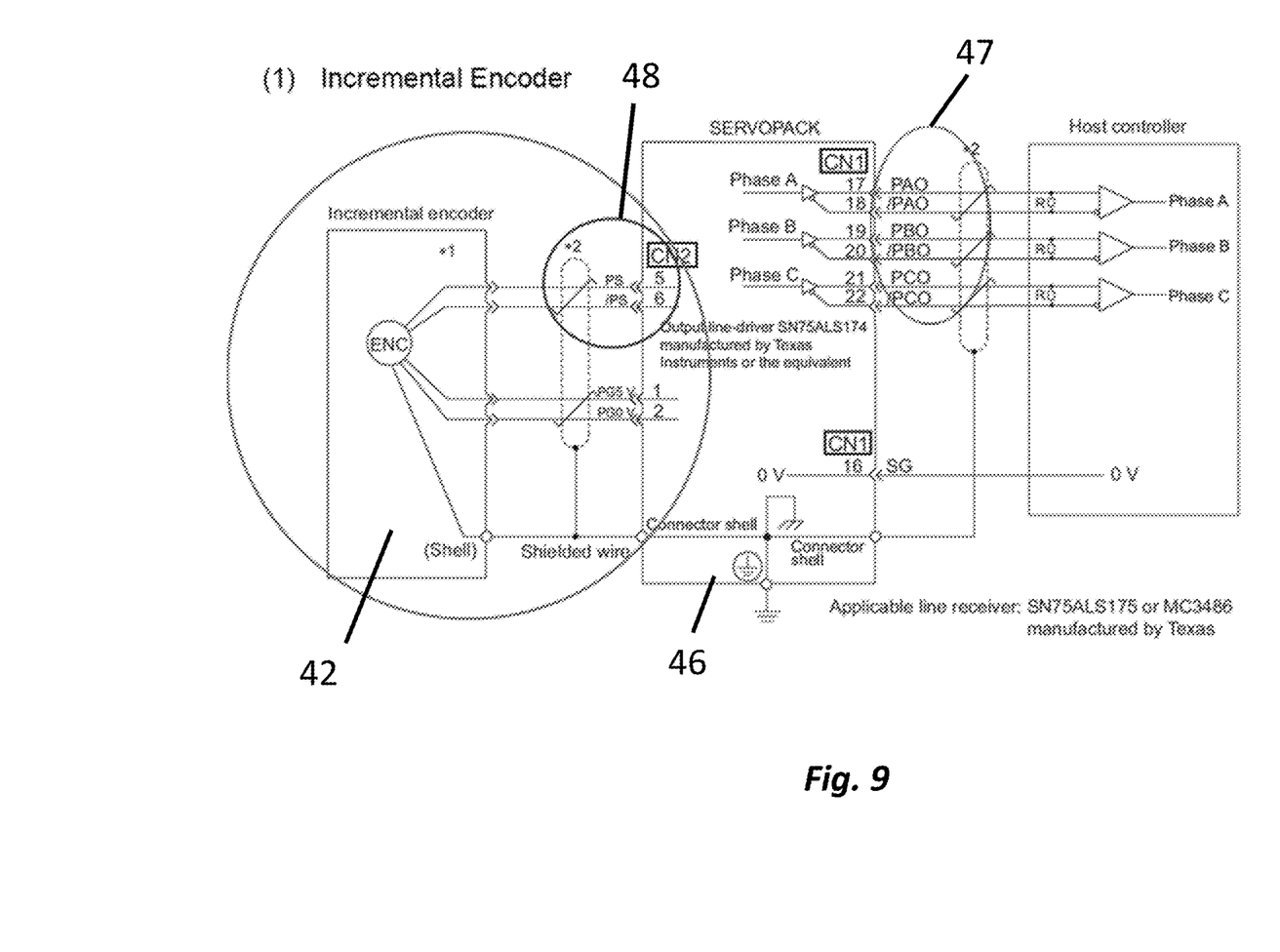
FIG. 9 is an exemplary circuit arrangement for an encoder forming part of the backlash monitoring system in accordance with the third embodiment of the invention.

An exemplary encoder and circuit arrangement forming part of the backlash monitoring system in accordance with the third embodiment of the invention is shown in FIG. 9.

In a test case, the encoder is configured at a resolution of 8192 pulses per rotation, which makes it possible to measure backlash on a 200 mm diameter faceplate rotary table to under a micron precision. This is more accurate than the current method used in the art for measuring backlash, which is accurate to 2 microns and requires an engineer onsite.

The servo encoder communication protocol will be different for each encoder. For the test-case encoder a differential serial protocol is used.

The encoder data is read from one of the data buses 47, 48 on the SERVOPACK 46 or on the ENCODER 42 as shown in FIG. 9. The encoder data may be put through some signal processing circuitry prior to being read by a microcontroller (not shown). The electromechanical switch signal is read by the microcontroller also. The read signals will be decoded by a software programme, for example firmware, with said decoded signals used to calculate the backlash.

The data may additionally be transmitted to a server for processing, employing, for example, a transmitter 31, shown schematically in FIG. 3.

Figure 10:
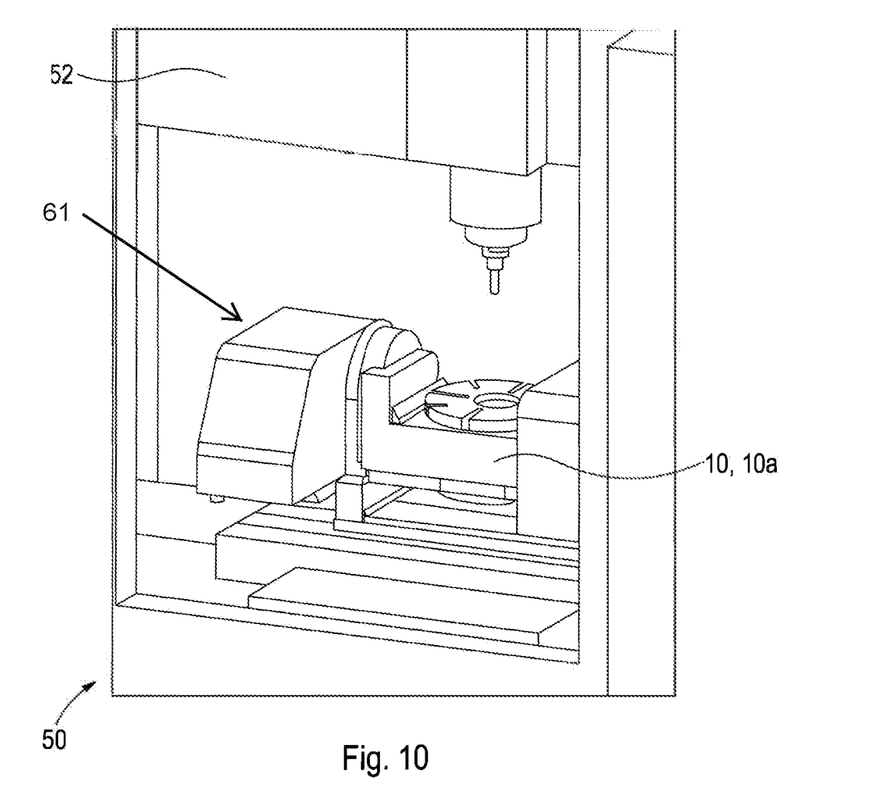
FIG. 10 is a partial view of a milling station incorporating a milling machine and a rotary table in accordance with the invention.

Referring to FIG. 10, a partial view of a milling station 50 incorporating a milling machine 52 and a rotary table 10, 10a in accordance with the invention is shown.

The central processing unit to which the transmitter 31 is configured to transmit the measured clearance or measured data for calculating the backlash may be part of the user interface unit 61 forming part of the milling station 50. Alternatively, it could be part of a computer or workstation remotely connected to the milling station 50, such as central computer 62, discussed below.

The data received in addition to being analyzed and collated, may be used to perform long-term trend analysis of the performance of the rotary table.

Figure 11:
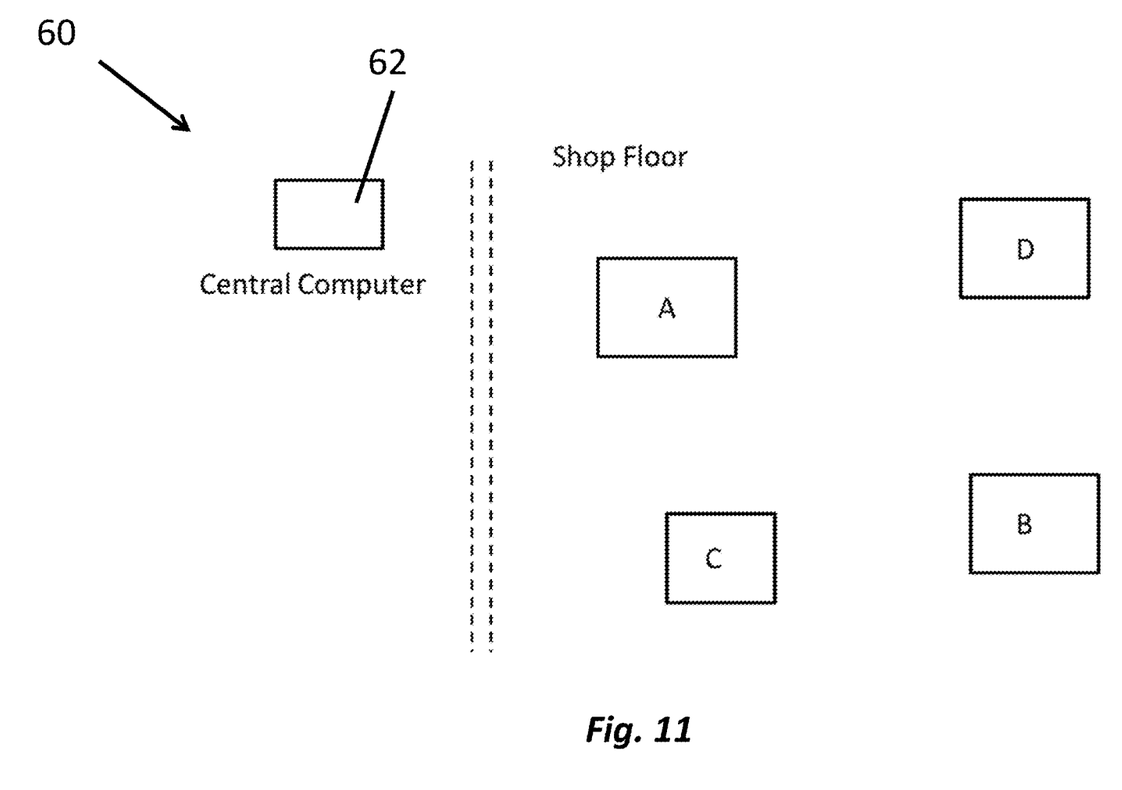
FIG. 11 is a schematic representation of a smart factory incorporating two or more milling stations in accordance with FIG. 10.

FIG. 11 shows a schematic representation of a smart factory 60 incorporating two or more milling stations A, B, C, D incorporating the rotary table and backlash monitoring system in accordance with the invention.

The smart factory 60 includes a central computer 62 to which all data collected in relation to the backlash of the rotary tables of each of the milling stations A, B, C, D is sent.

In the embodiment shown, the central computer 62 is located in a different location to the shop floor, but it would be understood that central computer 62 could be located on the shop floor.

The central computer 62 is preferably connected to a monitor or similar user interface such that the data from the different milling stations can be readily viewed and analyzed by workers in the factory.

This allows a factory worker to be aware of the change in the backlash value for a given milling machine and allow the worker to take proactive action should the backlash of the rotary table approach a critical value. The critical value would generally be one which results in finished workpiece does not meet its designed engineering tolerance.

The monitoring of the backlash for the different machines allows a worker to reassign a milling station for a different project if the resultant effect of the change in backlash on the rotary table is no longer appropriate for the initially designated project but would not affect the quality/standard of the workpiece for a different project.

Figure 12:
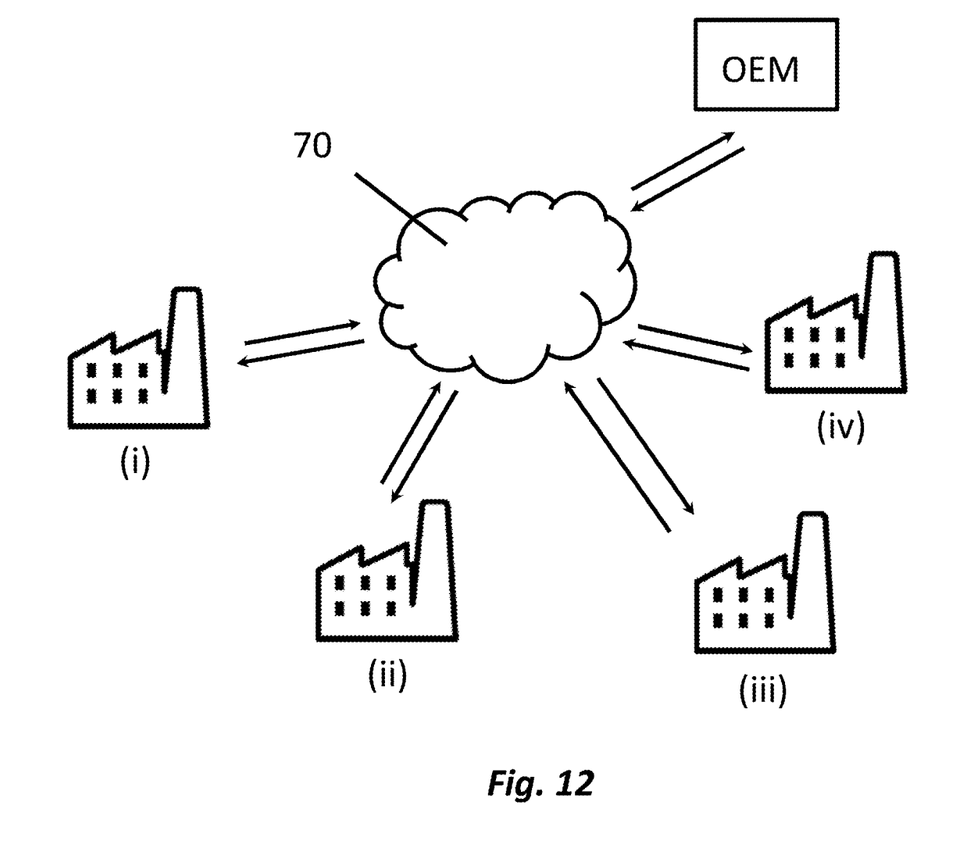
FIG. 12 is shows a schematic representation of collation of data from a plurality of factories using the monitoring system in accordance with the invention.

FIG. 12 shows a schematic representation of collation of data and its use to facilitate trend analysis and minimize downtime of milling stations and/or production of components which don't meet require manufacturing standards.

Data from the central computer of each smart factory is sent to a database 70 for analysis. The database may be on a cloud server or at a physical location. In FIG. 12, the database is shown located on a cloud server and only four smart factories (i), (ii), (iii), (iv) are shown.

The collated data from different factories is used to improve the trend analysis of the rotary tables.

The original equipment manufacturer OEM is also has access to the database.

If the trend analysis indicates that deterioration in the quality of a product being produced by a milling station will occur in the near future due to the reduced performance by the rotary table as a result in a change in the backlash of the table, said information is passed on to the relevant factory indicating the number of working hours left before the deterioration is estimated to occur.

A message can also be sent at the same time to a spare parts supplier or the rotary table manufacturer to arrange to arrange for the delivery of a replacement part.

This would minimize downtime of the milling station and reduce the likelihood of substandard workpieces being produced due to the change in the backlash of the rotary table.

While the system for monitoring the backlash of a rotary table in accordance with the invention has been described with reference to a single spindle rotary table, it would be understood that it can be readily adapted for use with multi-spindle rotary table configurations.

We claim:

1. A rotary table for a milling machine, comprising:
   a sensor configured to measure and/or calculate a clearance between two mating components of the rotary table;
   a transmitter configured to transmit the measured/calculated clearance to a central processing unit; and
   a switch mounted on a faceplate of the rotary table;
   wherein the mating components of the rotary table are a worm screw and a worm wheel.

2. A The rotary table of claim 1, wherein the sensor comprises a first encoder coupled to the worm screw of the rotary table and a second encoder coupled to the worm wheel of the rotary table.

3. The rotary table of claim 1, wherein the sensor comprises a current sensor configured to measure the current flow through a power line into a servo motor of the rotary table.

4. The rotary table according to claim 1, the sensor further comprises an encoder configured to measure the position of a servo motor of the rotary table.

5. A milling station comprising a milling machine and the rotary table of claim 1.

6. An industrial shop floor configuration comprising two or more milling stations according to claim 5.

7. A system for monitoring the characteristics of a rotary table comprising
   at least one rotary table in accordance with claim 1; and
   a central processor for receiving and processing data transmitted from the at least one rotary table.

8. The system according to claim 7, wherein the monitored characteristics of the rotary table is backlash.

9. The system of claim 7, wherein the central processor is a computer.

10. The system of claim 7, further comprising a local server on the same site as one of the at least one rotary table, the local server being connected to the central processor.

11. The system of claim 10, wherein the local server comprises a transmitter and a receiver, respectively configured to transmit and receive data and information from an offsite location.

12. The system of claim 10, wherein the local server comprises a user interface means.

13. The system of claim 10, wherein one or more of the at least one rotary table located on the same site as the local server is connected to the local server via a wired or wireless communication channel.

14. The system of claim 13, where each rotary table located on the same site as the local server is connected to the local server via a wired or wireless communication channel.

15. The system of claim 10, further comprising a master server located at a different site from the site of the local sever.

16. The system of claim 15 wherein the master server comprises a user interface.

* * * * *